United States Patent
Jung

(10) Patent No.: US 11,906,705 B2
(45) Date of Patent: Feb. 20, 2024

(54) OPTICAL SYSTEM

(71) Applicant: SAMSUNG ELECTRO-MECHANICS CO., LTD., Suwon-si (KR)

(72) Inventor: Jin Hwa Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 323 days.

(21) Appl. No.: 17/202,470

(22) Filed: Mar. 16, 2021

(65) Prior Publication Data

US 2021/0199929 A1 Jul. 1, 2021

Related U.S. Application Data

(63) Continuation of application No. 15/911,279, filed on Mar. 5, 2018, now Pat. No. 10,983,309, which is a
(Continued)

(30) Foreign Application Priority Data

Jul. 22, 2014 (KR) .......................... 10-2014-0092584

(51) Int. Cl.
*G02B 13/00* (2006.01)
*G02B 9/64* (2006.01)

(52) U.S. Cl.
CPC ............ *G02B 13/0045* (2013.01); *G02B 9/64* (2013.01)

(58) Field of Classification Search
CPC ............ A61B 5/14503; A61B 5/14532; A61B 5/14546; A61B 5/1455; A61B 5/1459;
(Continued)

(56) References Cited

U.S. PATENT DOCUMENTS 8,385,008 B2  2/2013 Hsieh et al.
8,599,495 B1  12/2013 Tsai et al.
(Continued)

FOREIGN PATENT DOCUMENTS

CN  202522758 U  11/2012
CN  202886713 U  4/2013
(Continued)

OTHER PUBLICATIONS

Chinese Office Action dated Mar. 23, 2017 in corresponding Chinese Patent Application No. 201510159249.1 (9 pages in Korean with English Translation).
(Continued)

*Primary Examiner* — Joseph P Martinez
*Assistant Examiner* — Vipin M Patel
(74) *Attorney, Agent, or Firm* — NSIP Law

(57) ABSTRACT

There is provided an optical system including: a first lens having positive refractive power and having a convex object-side surface; a second lens having positive refractive power; a third lens having refractive power; a fourth lens having refractive power; a fifth lens having refractive power; a sixth lens having refractive power; and a seventh lens having negative refractive power and having a concave image-side surface, wherein the first to seventh lenses are sequentially disposed from an object side, whereby an aberration improvement effect may be increased and a high degree of resolution may be realized.

14 Claims, 15 Drawing Sheets

Related U.S. Application Data continuation of application No. 14/643,942, filed on Mar. 10, 2015, now Pat. No. 9,952,406.

(58) Field of Classification Search
CPC . A61B 5/14865; A61B 5/6847; A61B 5/6861; A61N 1/05; A61N 1/326; G02B 13/0045; G02B 9/06

See application file for complete search history.

(56) References Cited

U.S. PATENT DOCUMENTS

| | | | |
|---|---|---|---|
| 9,128,270 | B2 | 9/2015 | Nishihata et al. |
| 2003/0117721 | A1 | 6/2003 | Kondo et al. |
| 2013/0070346 | A1 | 3/2013 | Hsu et al. |
| 2013/0188088 | A1 | 7/2013 | Miyatani et al. |
| 2014/0009841 | A1 | 1/2014 | Ebe et al. |
| 2014/0009843 | A1 | 1/2014 | Tsai et al. |
| 2014/0043694 | A1 | 2/2014 | Tsai et al. |
| 2014/0139719 | A1* | 5/2014 | Fukaya ............... G02B 27/0025 348/340 |
| 2014/0160580 | A1 | 6/2014 | Nishihata et al. |
| 2014/0211324 | A1 | 7/2014 | Ishizaka |
| 2015/0070783 | A1* | 3/2015 | Hashimoto ............ G06T 5/002 359/708 |
| 2015/0277083 | A1 | 10/2015 | Chae |
| 2015/0338607 | A1 | 11/2015 | Liao et al. |

FOREIGN PATENT DOCUMENTS

| | | |
|---|---|---|
| CN | 202886720 U | 4/2013 |
| CN | 203595858 U | 5/2014 |
| CN | 203606556 U | 5/2014 |
| CN | 203673137 U | 6/2014 |
| JP | 2002-365549 A | 12/2002 |
| JP | 2003-195162 A | 7/2003 |
| JP | 2009-025801 A | 2/2009 |
| JP | 2013-109179 A | 6/2013 |
| JP | 2013-148780 A | 8/2013 |
| JP | 2014-006275 A | 1/2014 |
| JP | 2014-16466 A | 1/2014 |
| JP | 2014-98743 A | 5/2014 |

OTHER PUBLICATIONS

Korean Office Action issued in counterpart Korean Application No. 10-2014-0092584 dated Oct. 2, 2015 (pp. 1-8 in English, 9-14 in Korean).

Chinese Office Action dated Feb. 6, 2020 in counterpart Chinese Patent Application No. 201810228577.6 (13 pages in English, 11 pages in Chinese).

Chinese Office Action dated Jun. 16, 2020 in counterpart Chinese Patent Application No. 201810228577.6 (7 pages in English, 6 pages in Chinese).

* cited by examiner

OPTICAL SYSTEM

CROSS-REFERENCE TO RELATED APPLICATION

This application is a Continuation Application of U.S. patent application Ser. No. 15/911,279 filed on Mar. 5, 2018, which is a Continuation Application of U.S. patent application Ser. No. 14/643,942 filed on Mar. 10, 2015, which claims the benefit under 35 USC 119(a) of Korean Patent Application No. 10-2014-0092584, filed Jul. 22, 2014, in the Korean Intellectual Property Office, the entire disclosures of which are incorporated herein by reference for all purposes.

BACKGROUND

The present disclosure relates to an optical system.

Recently, mobile communications terminals have commonly been provided with camera modules, enabling image capturing and video calling. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in obtaining camera modules having high levels of resolution and high degrees of performance.

In order to resolve such issues, recently, camera lenses have been formed of plastic, a material lighter than glass, and lens modules have been configured of five or more lenses to achieve high degrees of resolution.

SUMMARY

An aspect of the present disclosure may provide an optical system in which an aberration improvement effect is increased, and a high degree of resolution is realized.

According to an aspect of the present disclosure, an optical system may include: a first lens having positive refractive power and having a convex object-side surface; a second lens having positive refractive power; a third lens having refractive power; a fourth lens having refractive power; a fifth lens having refractive power; a sixth lens having refractive power; and a seventh lens having negative refractive power and having a concave image-side surface, wherein the first to seventh lenses are sequentially disposed from an object side, whereby an aberration improvement effect may be increased and a high degree of resolution may be realized.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
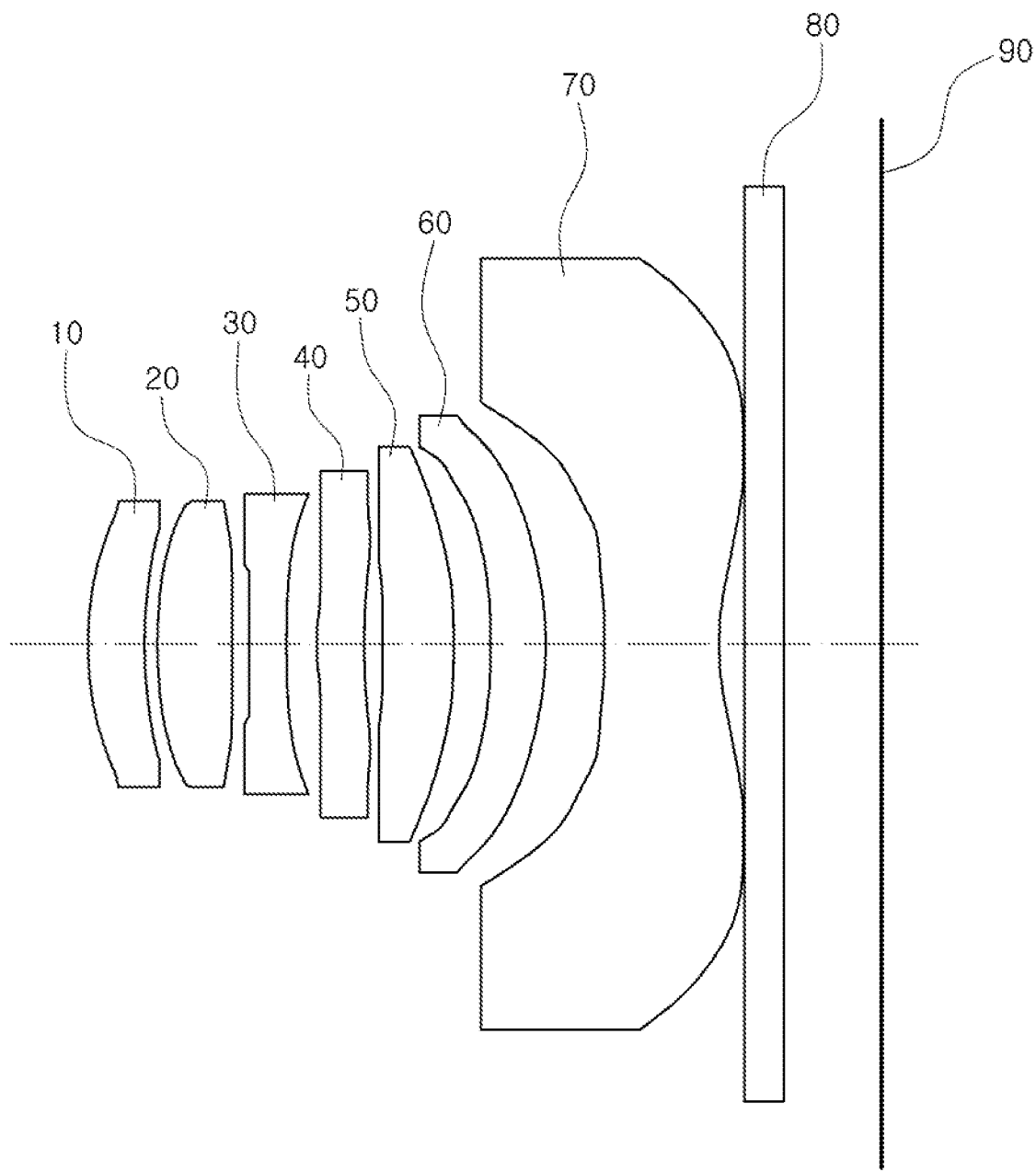
FIG. 1 is a view of an optical system according to a first exemplary embodiment of the present disclosure.

Exemplary embodiments of the present disclosure will now be described in detail with reference to the accompanying drawings.

The disclosure may; however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

In the present specification, a first lens refers to a lens closest to an object, while a seventh lens refers to a lens closest to an imaging surface.

In addition, a first surface of a lens refers to a surface thereof closest to an object (or an object-side surface) and a second surface of a lens refers to a surface thereof closest to an imaging surface (or an image-side surface). Further, all numerical values of radii of curvature, thicknesses, and the like, of lenses are indicated by millimeters (mm).

An optical system according to exemplary embodiments of the present disclosure may include seven lenses.

That is, the optical system may include a first lens 10, a second lens 20, a third lens 30, a fourth lens 40, a fifth lens 50, a sixth lens 60, and a seventh lens 70.

However, the optical system is not limited to only including the seven lenses, but may further include other components, if necessary. For example, the optical system may further include an infrared cut-off filter 80 filtering infrared light. Further, the optical system may further include an image sensor 90 converting an image of a subject incident thereon into an electrical signal. Further, the optical system may further include a gap maintaining member adjusting a gap between lenses.

In the optical system according to exemplary embodiments, the first to seventh lens 10 to 70 may be formed of plastic.

In addition, at least one of the first to seventh lenses 10 to 70 may have an aspherical surface. Alternatively, each of the first to sixth lenses 10 to 70 may have at least one aspherical surface.

That is, at least one of first and second surfaces of the first to seventh lenses 10 to 70 may be aspherical. Here, the aspherical surfaces of the first to seventh lenses 10 to 70 may be represented by the following Equation 1:

$$Z = \frac{cr^2}{1+\sqrt{1-(1+k)c^2r^2}} + Ar^4 + Br^6 + Cr^8 + Dr^{10} + Er^{12} + Gr^{16} + Hr^{18} + Jr^{20}$$ [Equation 1]

Here, c is a curvature (inverse number of a radius of curvature), K is a Conic constant, and r is a distance from a certain point on the aspherical surface of the lens to an optical axis in a direction perpendicular to the optical axis. In addition, constants A to J sequentially mean 4-th order to 20-th order aspherical surface coefficients. Further, Z is a distance between the certain point on the aspherical surface at the distance Y and a tangential plane meeting the apex of the aspherical surface of the lens.

The optical system including the first to seventh lenses 10 to 70 may have lenses having positive refractive power/positive refractive power/negative refractive power/positive or negative refractive power/positive or negative refractive power/positive refractive power/negative refractive power sequentially from an object side.

The optical system configured as described above may improve optical performance through aberration improvement. In addition, in the optical system configured as described above, all of the seven lenses may be formed of plastic.

The optical system according to exemplary embodiments may satisfy Conditional Expression 1.

$$IMH/EPD<2.0$$ [Conditional Expression 1]

Here, IMH is a diagonal length of the image sensor 90, and EPD is an entrance pupil diameter of the optical system.

Here, when IMH/EPD is out of an upper limit value of Conditional Expression 1, it may be difficult to realize a bright lens while satisfying a predetermined field of view or more.

The optical system according to exemplary embodiments may satisfy Conditional Expression 2.

$$BFL/TTL<0.25$$ [Conditional Expression 2]

Here, BFL is a distance from an image-side surface of the seventh lens to an imaging surface, and TTL is a distance from an object-side surface of the first lens to the imaging surface.

Here, when BFL/TTL is out of an upper limit value of Conditional Expression 2, it is difficult to secure a distance between each lens and the imaging surface, causing difficulty in manufacturing the optical system.

The optical system according to exemplary embodiments may satisfy Conditional Expression 3.

$$TTL/F<1.2$$ [Conditional Expression 3]

Here, TTL is the distance from the object-side surface of the first lens to the imaging surface, and F is an overall focal length of the optical system.

Here, when TTL/F is out of an upper limit value of Conditional Expression 3, it may be difficult to realize miniaturization of the optical system while satisfying a predetermined field of view or more.

The optical system according to exemplary embodiments may satisfy Conditional Expression 4.

$$|Nd4-Nd6|<0.1$$ [Conditional Expression 4]

Here, Nd4 is a refractive index of the fourth lens, and Nd6 is a refractive index of the sixth lens.

Here, when |Nd4-Nd6| is out of an upper limit value of Conditional. Expression 4, it may be difficult to realize a high degree of resolution and improve chromatic aberration.

The optical system according to exemplary embodiments may satisfy Conditional Expression 5.

$$(r3-r4)/(r3+r4)<-1.0$$ [Conditional Expression 5]

Here, r3 is a radius of curvature of an object-side surface of the second lens, and r4 is a radius of curvature of an image-side surface of the second lens.

Here, when (r3−r4)/(r3+r4) is out of an upper limit value of Conditional Expression 5, it is not easy to collect aberration, causing difficulty in realizing a high degree of resolution.

The optical system according to exemplary embodiments may satisfy Conditional Expression 6.

$$|(r7-r8)/(r7+r8)|<1.4$$ [Conditional Expression 6]

Here, r7 is a radius of curvature of an object-side surface of the fourth lens, and r8 is a radius of curvature of an image-side surface of the fourth lens.

Here, when (r7−r8)/(r7+r8) is out of an upper limit value of Conditional Expression 6, it is not easy to collect aberration, causing difficulty in realizing a high degree of resolution.

The optical system according to exemplary embodiments may satisfy Conditional Expression 7.

$$r14/F>0.3$$ [Conditional Expression 7]

Here, r14 is a radius of curvature of the image-side surface of the seventh lens, and F is the overall focal length of the optical system.

Here, when r14/F is out of a lower limit value of Conditional Expression 7, it is not easy to collect aberration, causing difficulty in realizing a high degree of resolution and difficulty in decreasing a manufacturing cost.

$$F12/F>0.5$$ [Conditional Expression 8]

Here, F12 is a composite focal length of the first and second lenses, and F is the overall focal length of the optical system.

Here, when F12/F is out of a lower limit value of Conditional Expression, refractive power becomes excessively large, causing difficulty in collecting spherical aberration.

Next, the first to seventh lens 10 to 70 configuring the optical system according to exemplary embodiments will be described.

The first lens 10 may have positive refractive power. In addition, the first lens 10 may have a meniscus shape of which an object-side surface is convex. In detail, first and second surfaces of the first lens 10 may be convex toward the object.

At least one of the first and second surfaces of the first lens 10 may be aspherical. For example, both surfaces of the first lens may be aspherical.

The second lens 20 may have positive refractive power. In addition, both surfaces of the second lens 20 may be convex.

At least one of first and second surfaces of the second lens 20 may be aspherical. For example, both surfaces of the second lens 20 may be aspherical.

The third lens 30 may have negative refractive power. In addition, both surfaces of the third lens 30 may be concave.

At least one of first and second surfaces of the third lens 30 may be aspherical. For example, both surfaces of the third lens 30 may be aspherical.

The fourth lens 40 may have positive or negative refractive power. In addition, the fourth lens 40 may have a meniscus shape of which an object-side surface is convex. In detail, first and second surfaces of the fourth lens 40 may be convex toward the object.

In addition, the fourth lens 40 may have positive refractive power and have both surfaces that are convex.

At least one of the first and second surfaces of the fourth lens 40 may be aspherical. For example, both surfaces of the fourth lens 40 may be aspherical.

The fifth lens 50 may have positive or negative refractive power. In addition, the fifth lens 50 may have a meniscus shape of which an image-side surface is convex. In detail, a first surface of the fifth lens 50 may be concave toward the object, and a second surface thereof may be convex toward the imaging surface.

At least one of the first and second surfaces of the fifth lens 50 may be aspherical. For example, both surfaces of the fifth lens 50 may be aspherical.

The sixth lens 60 may have positive refractive power. In addition, the sixth lens 60 may have a meniscus shape of which an image-side surface is convex. In detail, a first surface of the sixth lens 60 may be concave toward the object, and a second surface thereof may be convex toward the imaging surface.

At least one of the first and second surfaces of the sixth lens 60 may be aspherical. For example, both surfaces of the sixth lens 60 may be aspherical.

The seventh lens 70 may have negative refractive power. In addition, both surfaces of the seventh lens 70 may be concave. In addition, the seventh lens 70 may have a meniscus shape of which an object-side surface is convex.

In addition, the seventh lens 70 may have an inflection point formed on at least any one of first and second surfaces thereof. For example, the second surface of the seventh lens 70 may be concave in a paraxial region and become convex at an edge thereof.

At least one of the first and second surfaces of the seventh lens 70 may be aspherical. For example, both surfaces of the seventh lens 70 may be aspherical.

In the optical system configured as described above, a plurality of lenses perform an aberration correction function, whereby aberration performance may be improved. In addition, in the optical system, all of the lenses are formed of plastic, whereby a cost required for manufacturing a lens module may be decreased and manufacturing efficiency of the lens module may be increased.

An optical system according to a first exemplary embodiment of the present disclosure will be described with reference to FIGS. 1 through 3.

The optical system according to the first exemplary embodiment may include a first lens 10, a second lens 20, a third lens 30, a fourth lens 40, a fifth lens 50, a sixth lens 60, and a seventh lens 70, and may further include an infrared cut-off filter 80 and an image sensor 90.

Here, respective characteristics (radii of curvature, thicknesses of lenses or distances between the lenses, refractive indices, and Abbe numbers) of lenses are illustrated in Table 1.

TABLE 1

| Surface | Radius | Thickness | Index | Abbe Number |
|---|---|---|---|---|
| Object | Infinity | Infinity | | |
| 1 | 1.95 | 0.37 | 1.544 | 56.1 |
| 2 | 2.711 | 0.08 | | |
| 3 | 2.478 | 0.514 | 1.544 | 56.1 |
| 4 | −7.494 | 0.1 | | |
| 5 | −8.354 | 0.24 | 1.639 | 23.2 |
| 6 | 4.731 | 0.213 | | |
| 7 | 4.292 | 0.317 | 1.639 | 23.2 |
| 8 | 4.034 | 0.121 | | |
| 9 | −35.733 | 0.467 | 1.544 | 56.1 |
| 10 | −3.222 | 0.259 | | |
| 11 | −2.446 | 0.352 | 1.639 | 23.2 |
| 12 | −2.118 | 0.401 | | |
| 13 | −9.809 | 0.763 | 1.534 | 55.7 |
| 14 | 2.087 | 0.154 | | |
| 15 | Infinity | 0.3 | 1.517 | 64.2 |
| 16 | Infinity | 0.6069 | | |
| Image | Infinity | 0.0026 | | |

In the first exemplary embodiment, the first lens 10 may have positive refractive power, and have a meniscus shape of which an object-side surface is convex. The second lens 20 may have positive refractive power and have both surfaces that are convex. The third lens 30 may have negative refractive power and have both surfaces that are concave. The fourth lens 40 may have negative refractive power and have a meniscus shape of which an object-side surface is convex. The fifth lens 50 may have positive refractive power and have a meniscus shape of which an image-side surface is convex. The sixth lens 60 may have positive refractive power and have a meniscus shape of which an image-side surface is convex. The seventh lens 70 may have negative refractive power and have both surfaces that are concave. In addition, the seventh lens 70 may have an inflection point formed on at least one of first and second surfaces thereof.

Meanwhile, respective surfaces of the first to seventh lenses 10 to 70 may have aspherical surface coefficients as illustrated in Table 2. That is, all of the first surface of the first lens 10 to the second surface of the seventh lens 70 may be aspherical.

TABLE 2

| Example 1 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Y Radius | 1.950 | 2.711 | 2.478 | −7.494 | −8.354 | 4.731 | 4.292 | 4.034 | −35.733 | −3.222 | −2.446 | −2.118 | −9.809 | 2.067 |
| Conic (K) | −0.848 | 0.000 | 0.000 | −51.018 | −38.780 | 17.336 | 0.000 | −27.496 | 0.000 | 0.000 | 0.000 | −0.194 | −62.710 | −10.695 |
| 4th Order (A) | −0.024 | 0.072 | −0.027 | −0.018 | 0.035 | −0.013 | −0.180 | −0.143 | −0.103 | 0.000 | 0.123 | 0.121 | −0.136 | −0.053 |
| 6th Order (B) | −0.021 | −0.037 | −0.024 | −0.083 | −0.097 | 0.046 | 0.151 | 0.130 | 0.107 | 0.107 | −0.136 | −0.099 | 0.024 | 0.014 |
| 8th Order (C) | 0.006 | 0.156 | 0.183 | 0.206 | 0.222 | −0.025 | −0.163 | −0.119 | −0.051 | −0.092 | 0.057 | 0.039 | −0.002 | −0.003 |
| 10th Order (D) | −0.022 | −0.170 | −0.152 | −0.147 | −0.198 | 0.018 | 0.131 | 0.077 | 0.021 | 0.011 | −0.022 | −0.011 | −0.002 | 0.000 |
| 12th Order (E) | 0.009 | 0.053 | 0.041 | 0.036 | 0.064 | −0.005 | −0.040 | −0.017 | −0.001 | −0.001 | 0.004 | 0.002 | 0.000 | 0.000 |
| 14th Order (F) | 0.000 | 0.000 | 0.000 | 0.000 | 0.000 | 0.000 | 0.000 | 0.000 | 0.000 | 0.000 | 0.000 | 0.000 | 0.000 | 0.000 |

Figure 2:
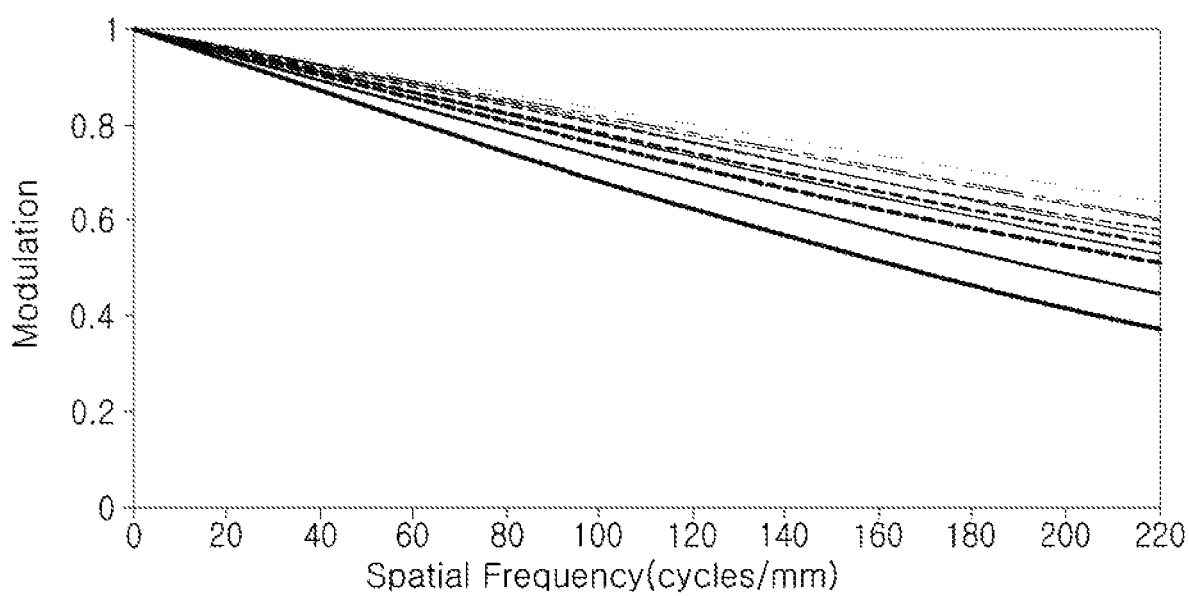
FIGS. 2 and 3 are graphs having curves representing aberration characteristics of the optical system illustrated in FIG. 1.
Figure 3:
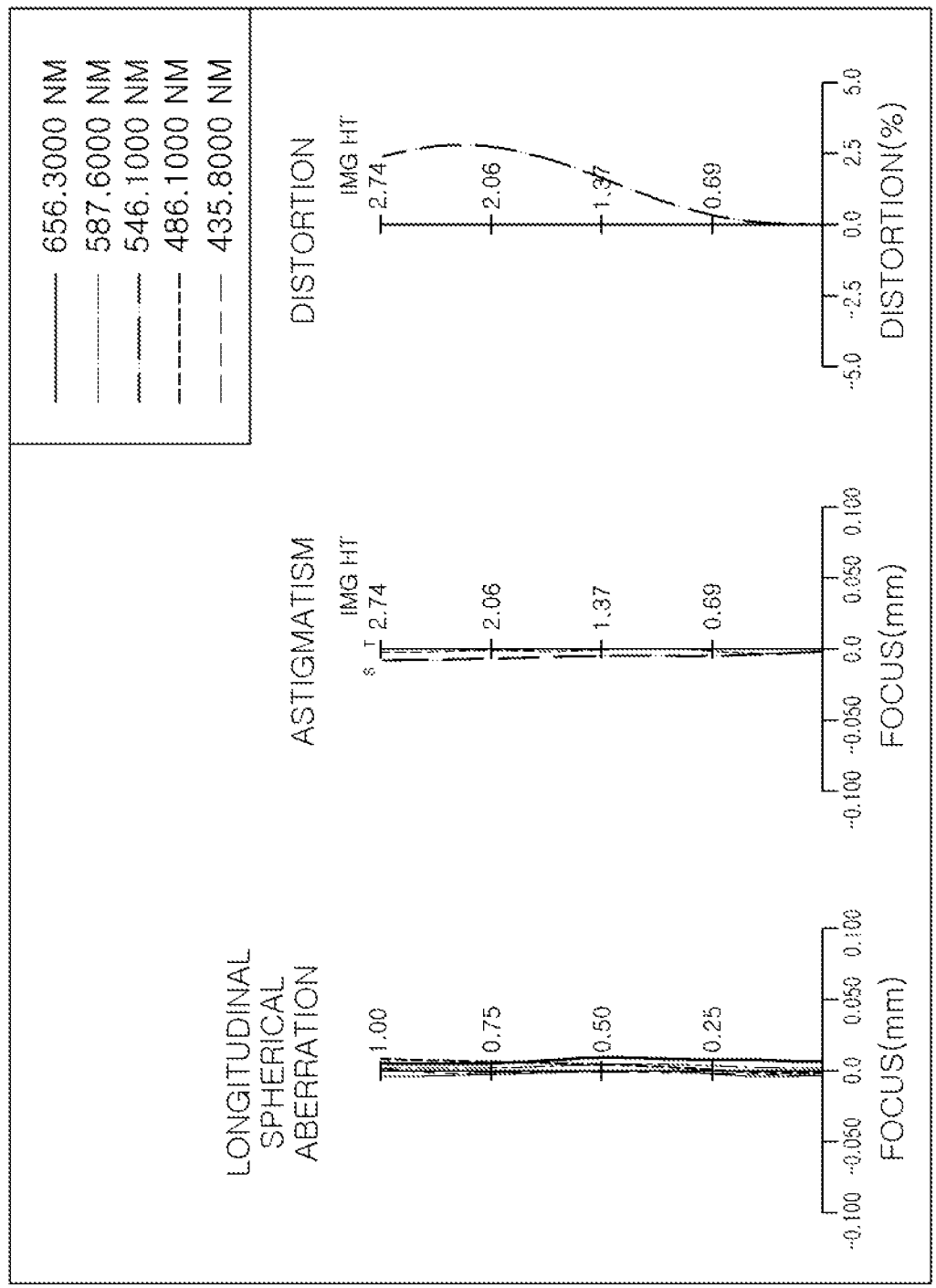

In addition, the optical system configured as described above may have aberration characteristics illustrated in FIGS. 2 and 3.

Figure 4:
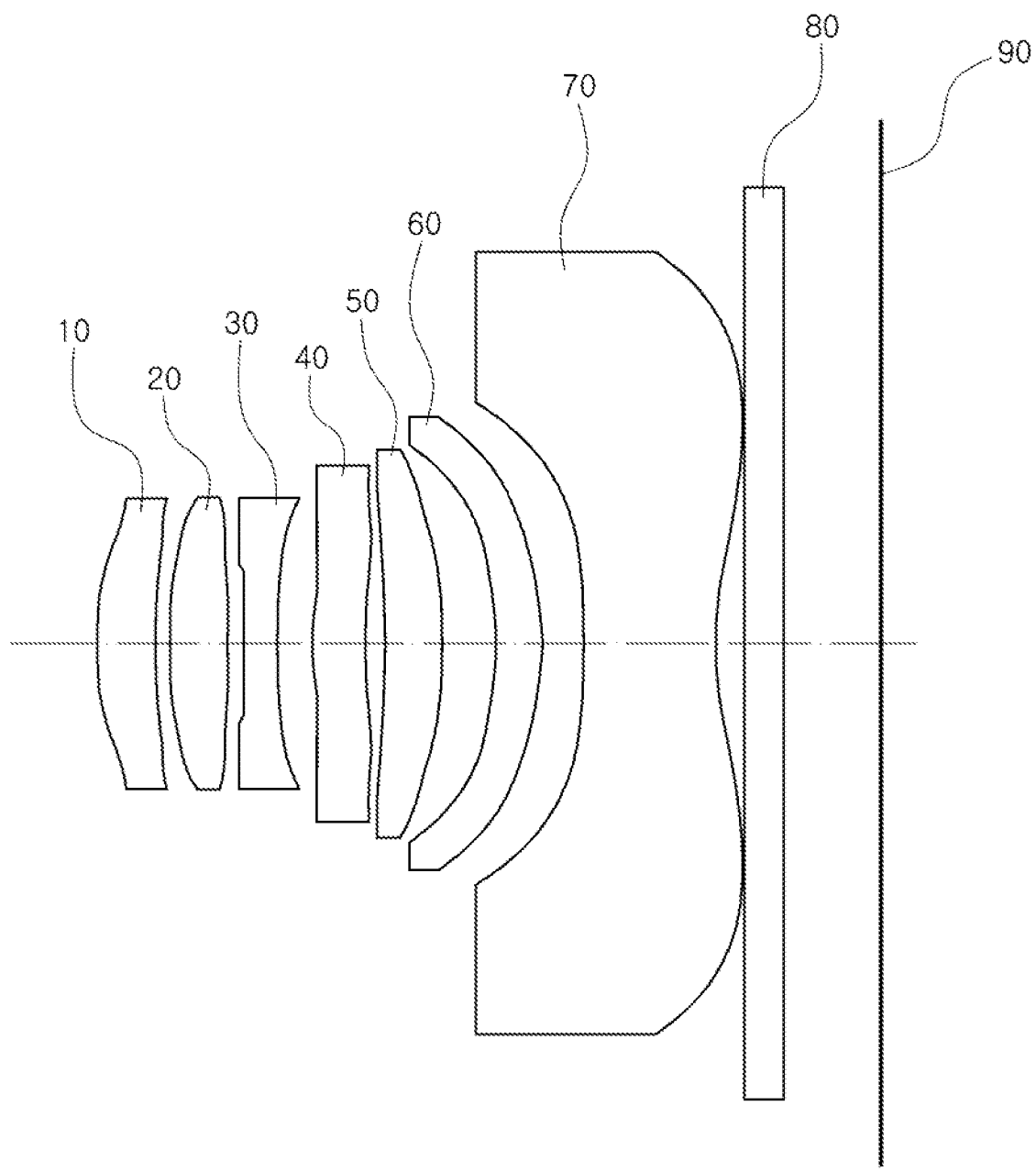
FIG. 4 is a view of an optical system according to a second exemplary embodiment of the present disclosure.

An optical system according to a second exemplary embodiment of the present disclosure will be described with reference to FIGS. 4 through 6.

The optical system according to the second exemplary embodiment may include a first lens 10, a second lens 20, a third lens 30, a fourth lens 40, a fifth lens 50, a sixth lens 60, and a seventh lens 70, and may further include an infrared cut-off filter 80 and an image sensor 90.

Here, respective characteristics (radii of curvature, thicknesses of lenses or distances between the lenses, refractive indices, and Abbe numbers) of lenses are illustrated in Table 3,

TABLE 3

| Surface | Radius | Thickness | Index | Abbe Number |
|---|---|---|---|---|
| Object | Infinity | Infinity | | |
| 1 | 1.950 | 0.378 | 1.544 | 56.1 |
| 2 | 3.284 | 0.100 | | |
| 3 | 2.921 | 0.400 | 1.544 | 56.1 |
| 4 | −8.375 | 0.100 | | |
| 5 | −9.516 | 0.220 | 1.639 | 23.2 |
| 6 | 4.647 | 0.254 | | |
| 7 | 4.611 | 0.350 | 1.639 | 23.2 |
| 8 | 4.472 | 0.141 | | |
| 9 | −38.360 | 0.367 | 1.544 | 56.1 |
| 10 | −3.349 | 0.381 | | |
| 11 | −1.934 | 0.311 | 1.639 | 23.2 |
| 12 | −1.766 | 0.272 | | |
| 13 | −13.212 | 0.902 | 1.534 | 55.7 |
| 14 | 2.062 | 0.176 | | |
| 15 | Infinity | 0.300 | 1.517 | 64.2 |
| 16 | Infinity | 0.605 | | |
| Image | Infinity | 0.004 | | |

In the second exemplary embodiment, the first lens 10 may have positive refractive power, and have a meniscus shape of which an object-side surface is convex. The second lens 20 may have positive refractive power and have both surfaces that are convex. The third lens 30 may have negative refractive power and have both surfaces that are concave. The fourth lens 40 may have negative refractive power and have a meniscus shape of which an object-side surface is convex. The fifth lens 50 may have positive refractive power and have a meniscus shape of which an image-side surface is convex. The sixth lens 60 may have positive refractive power and have a meniscus shape of which an image-side surface is convex. The seventh lens 70 may have negative refractive power and have both surfaces that are concave. In addition, the seventh lens 70 may have an inflection point formed on at least one of first and second surfaces thereof.

Meanwhile, respective surfaces of the first to seventh lenses 10 to 70 may have aspherical surface coefficients as illustrated in Table 4. That is, all of the first surface of the first lens 10 to the second surface of the seventh lens 70 may be aspherical.

TABLE 4

| Example 2 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Y Radius | 1.950 | 3.284 | 2.921 | −8.376 | −9.516 | 4.647 | 4.611 | 4.472 | −38.360 | −3.349 | −1.934 | −1.766 | −13.212 | 2.062 |
| Conic (K) | −1.020 | 0.000 | 0.000 | −30.147 | −38.780 | 17.506 | 0.000 | −24.728 | 0.000 | 0.000 | 0.000 | −0.226 | −62.710 | −10.695 |
| 4th Order (A) | −0.027 | −0.081 | −0.026 | 0.004 | 0.036 | −0.024 | −0.152 | −0.124 | −0.061 | −0.107 | 0.140 | 0.139 | −0.120 | −0.042 |
| 6th Order (B) | −0.025 | −0.035 | −0.023 | −0.114 | −0.100 | −0.107 | 0.114 | 0.105 | 0.074 | −0.186 | −0.142 | −0.112 | 0.017 | 0.010 |
| 8th Order (C) | 0.002 | 0.158 | 0.203 | 0.245 | 0.229 | −0.013 | −0.122 | −0.107 | −0.064 | −0.107 | 0.053 | 0.043 | −0.001 | −0.002 |
| 10th Order (D) | −0.016 | −0.161 | −0.166 | −0.195 | −0.208 | 0.016 | −0.107 | 0.079 | 0.035 | 0.229 | −0.015 | −0.011 | −0.001 | 0.000 |
| 12th Order (E) | 0.009 | 0.051 | 0.037 | 0.054 | 0.077 | −0.004 | −0.038 | −0.019 | −0.005 | 0.000 | 0.001 | 0.001 | 0.000 | 0.000 |
| 14th Order (F) | 0.000 | 0.000 | 0.000 | 0.000 | 0.000 | 0.000 | 0.000 | 0.000 | 0.000 | 0.000 | 0.000 | 0.000 | 0.000 | 0.000 |

Figure 5:
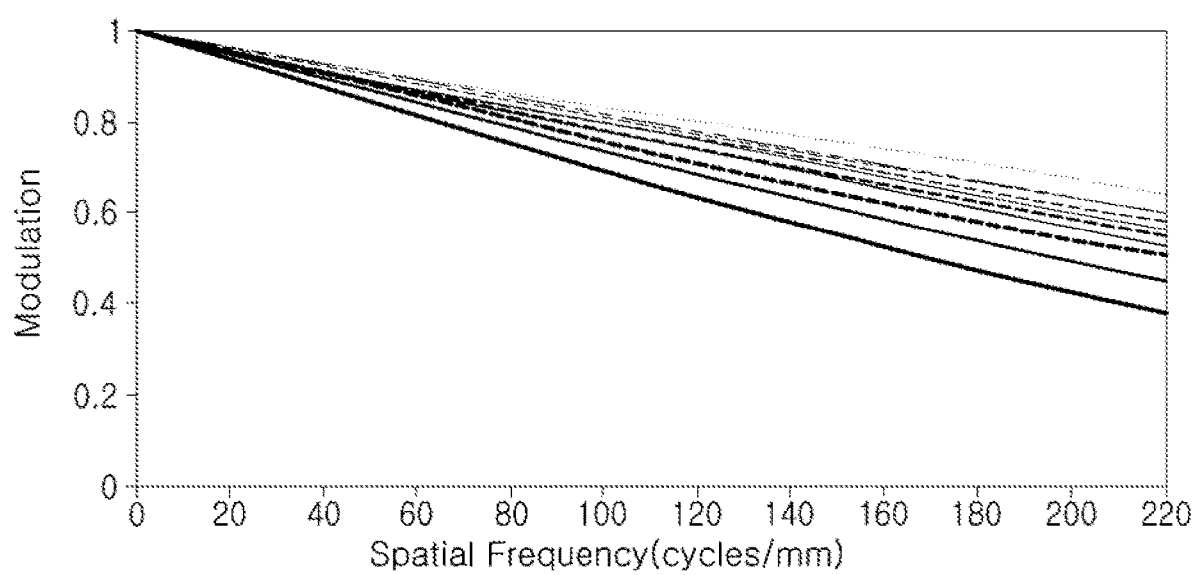
FIGS. 5 and 6 are graphs having curves representing aberration characteristics of the optical system illustrated in FIG. 4.
Figure 6:
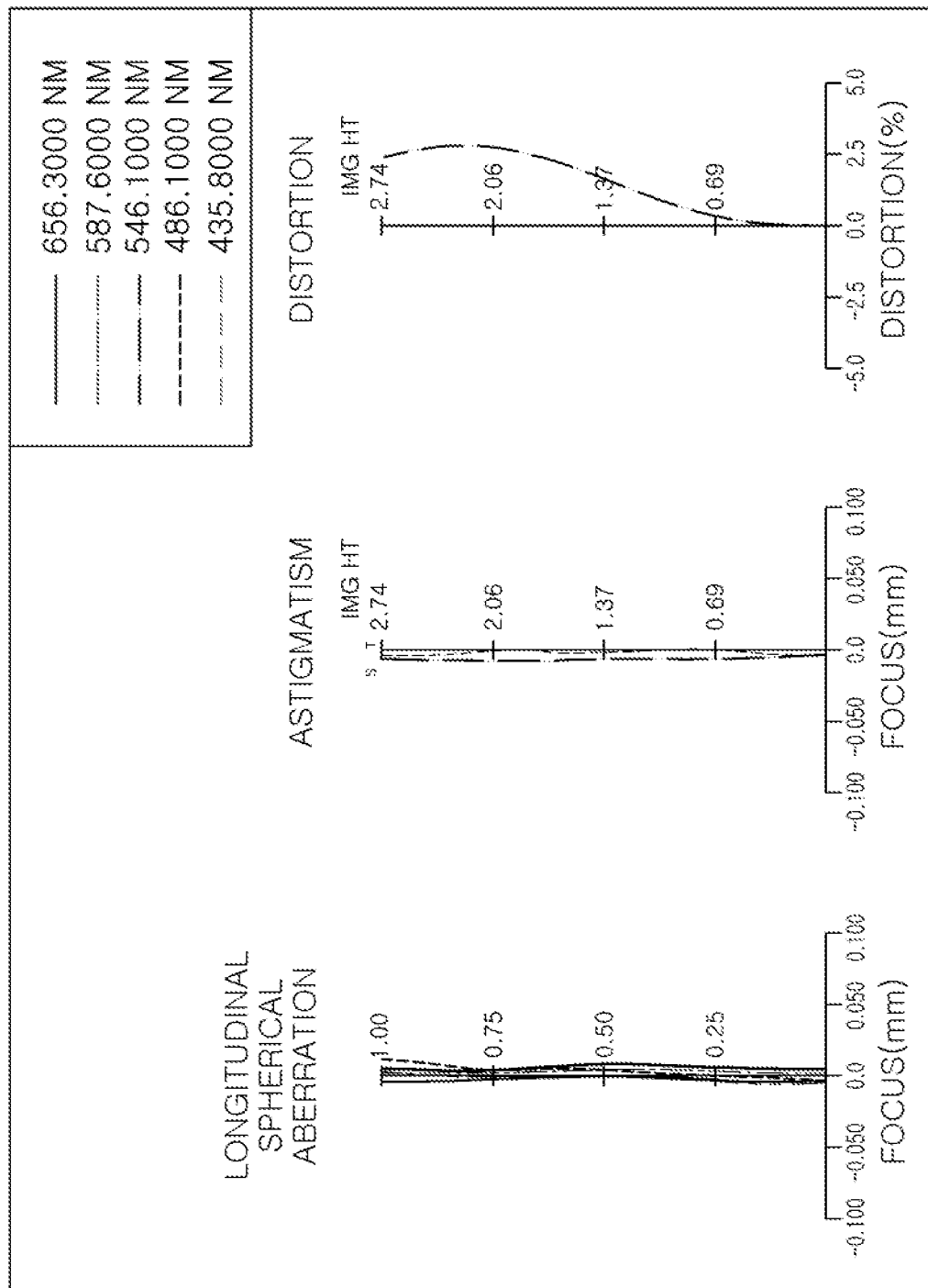

In addition, the optical system configured as described above may have aberration characteristics illustrated in FIGS. 5 and 6.

Figure 7:
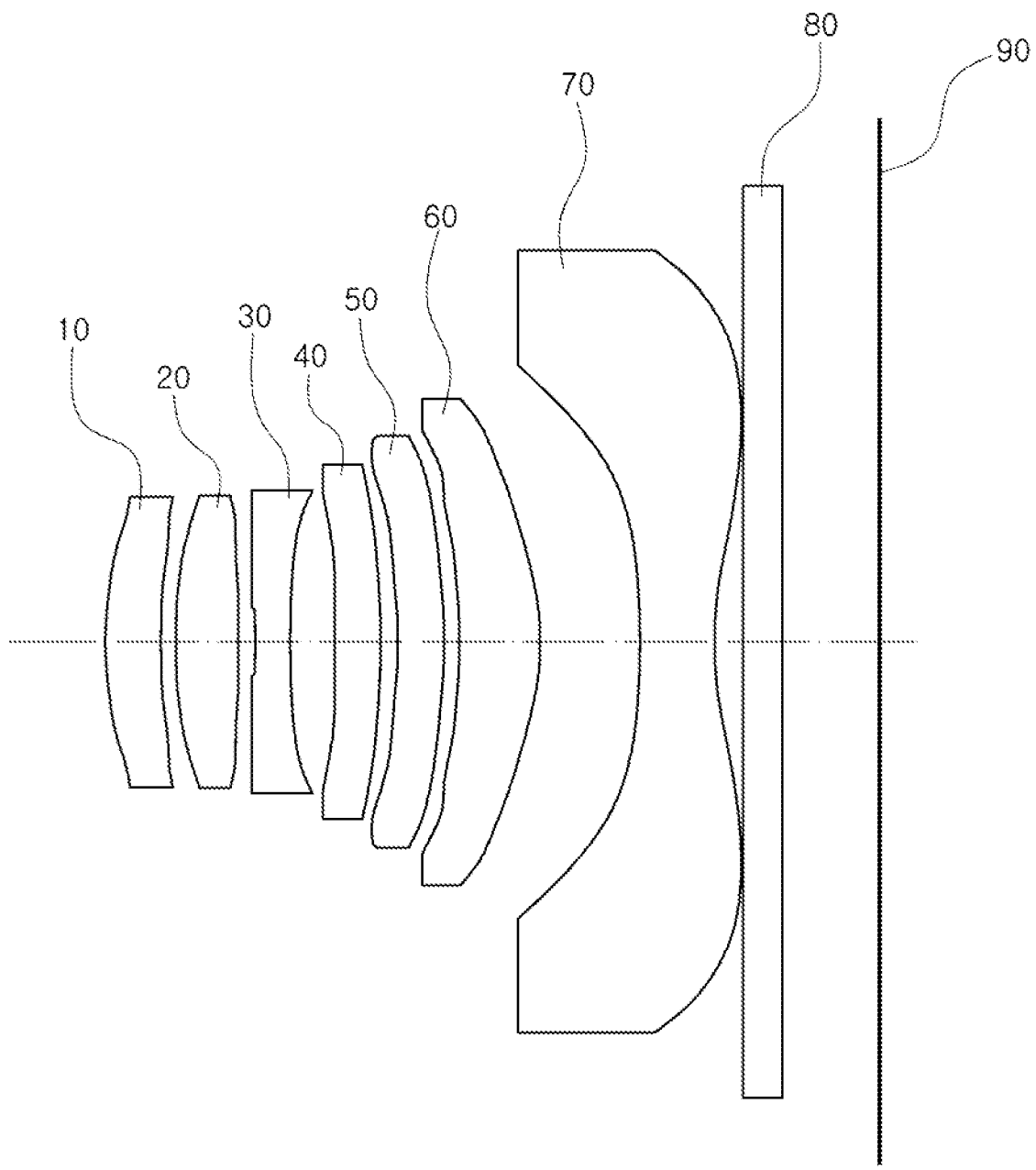
FIG. 7 is a view of an optical system according to a third exemplary embodiment of the present disclosure.

An optical system according to a third exemplary embodiment of the present disclosure will be described with reference to FIGS. 7 through 9.

The optical system according to the third exemplary embodiment may include a first lens 10, a second lens 20, a third lens 30, a fourth lens 40, a fifth lens 50, a sixth lens 60, and a seventh lens 70, and may further include an infrared cut-off filter 80 and an image sensor 90.

Here, respective characteristics (radii of curvature, thicknesses of lenses or distances between the lenses, refractive indices, and Abbe numbers) of lenses are illustrated in Table 5.

TABLE 5

| Surface | Radius | Thickness | Index | Abbe Number |
|---|---|---|---|---|
| Object | Infinity | Infinity | | |
| 1 | 2.186 | 0.368 | 1.544 | 56.1 |
| 2 | 4.260 | 0.100 | | |
| 3 | 2.946 | 0.423 | 1.544 | 56.1 |
| 4 | −5.824 | 0.100 | | |
| 5 | −6.306 | 0.240 | 1.639 | 23.2 |
| 6 | 4.638 | 0.300 | | |
| 7 | 13.116 | 0.318 | 1.639 | 23.2 |
| 8 | −83.608 | 0.102 | | |
| 9 | −4.616 | 0.300 | 1.544 | 56.1 |
| 10 | −4.751 | 0.112 | | |
| 11 | −3.645 | 0.537 | 1.544 | 56.1 |
| 12 | −1.619 | 0.691 | | |
| 13 | −5.209 | 0.493 | 1.534 | 55.7 |
| 14 | 2.039 | 0.166 | | |
| 15 | Infinity | 0.300 | 1.517 | 64.2 |
| 16 | Infinity | 0.614 | | |
| Image | Infinity | −0.004 | | |

In the third exemplary embodiment, the first lens 10 may have positive refractive power, and have a meniscus shape of which an object-side surface is convex. The second lens 20 may have positive refractive power and have both surfaces that are convex. The third lens 30 may have negative refractive power and have both surfaces that are concave. The fourth lens 40 may have positive refractive power and have both surfaces that are convex. The fifth lens 50 may have negative refractive power and have a meniscus shape of which an image-side surface is convex. The sixth lens 60 may have positive refractive power and have a meniscus shape of which an image-side surface is convex. The seventh lens 70 may have negative refractive power and have both surfaces that are concave. In addition, the seventh lens 70 may have an inflection point formed on at least one of first and second surfaces thereof.

Meanwhile, respective surfaces of the first to seventh lenses 10 to 70 may have aspherical surface coefficients as illustrated in Table 6. That is, all of the first surface of the first lens 10 to the second surface of the seventh lens 70 may be aspherical.

TABLE 6

| Example 3 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Y Radius | 2.186 | 4.260 | 2.946 | −5.824 | −6.306 | 4.638 | 13.116 | −83.608 | −4.616 | −4.751 | −3.645 | −1.619 | −1.619 | 2.039 |
| Conic (K) | −1.133 | 0.000 | 0.000 | −8.000 | −36.780 | 16.697 | 0.000 | −9.207 | −1.830 | 0.000 | 0.000 | −2.667 | −2.667 | −10.694 |
| 4th Order (A) | −0.035 | −0.092 | −0.038 | −0.001 | 0.035 | −0.004 | −0.166 | −0.133 | −0.039 | 0.012 | 0.074 | 0.055 | 0.055 | −0.049 |
| 6th Order (B) | −0.016 | 0.039 | 0.039 | −0.073 | −0.055 | 0.029 | 0.018 | 0.030 | 0.095 | 0.032 | −0.089 | −0.037 | −0.037 | 0.012 |
| 8th Order (C) | −0.010 | 0.026 | 0.070 | 0.108 | 0.124 | 0.023 | −0.007 | −0.020 | −0.108 | 0.035 | 0.073 | 0.032 | 0.032 | −0.002 |
| 10th Order (D) | 0.008 | −0.021 | −0.065 | −0.068 | −0.114 | −0.009 | 0.109 | 0.042 | 0.045 | −0.014 | −0.028 | −0.014 | −0.014 | 0.000 |
| 12th Order (E) | −0.002 | −0.001 | 0.015 | 0.019 | 0.040 | −0.008 | −0.060 | −0.013 | −0.003 | 0.000 | 0.002 | 0.002 | 0.002 | 0.000 |
| 14th Order (F) | 0.000 | 0.000 | 0.000 | 0.000 | 0.000 | 0.000 | 0.000 | 0.000 | 0.000 | 0.000 | 0.000 | 0.000 | 0.000 | 0.000 |

Figure 8:
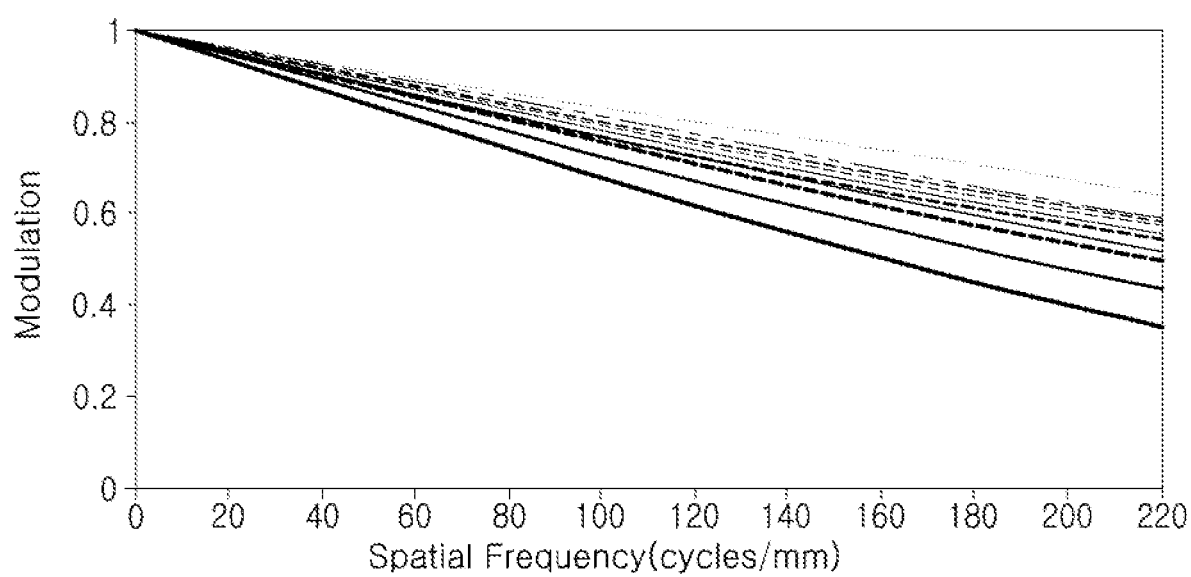
FIGS. 8 and 9 are graphs having curves representing aberration characteristics of the optical system illustrated in FIG. 7.
Figure 9:
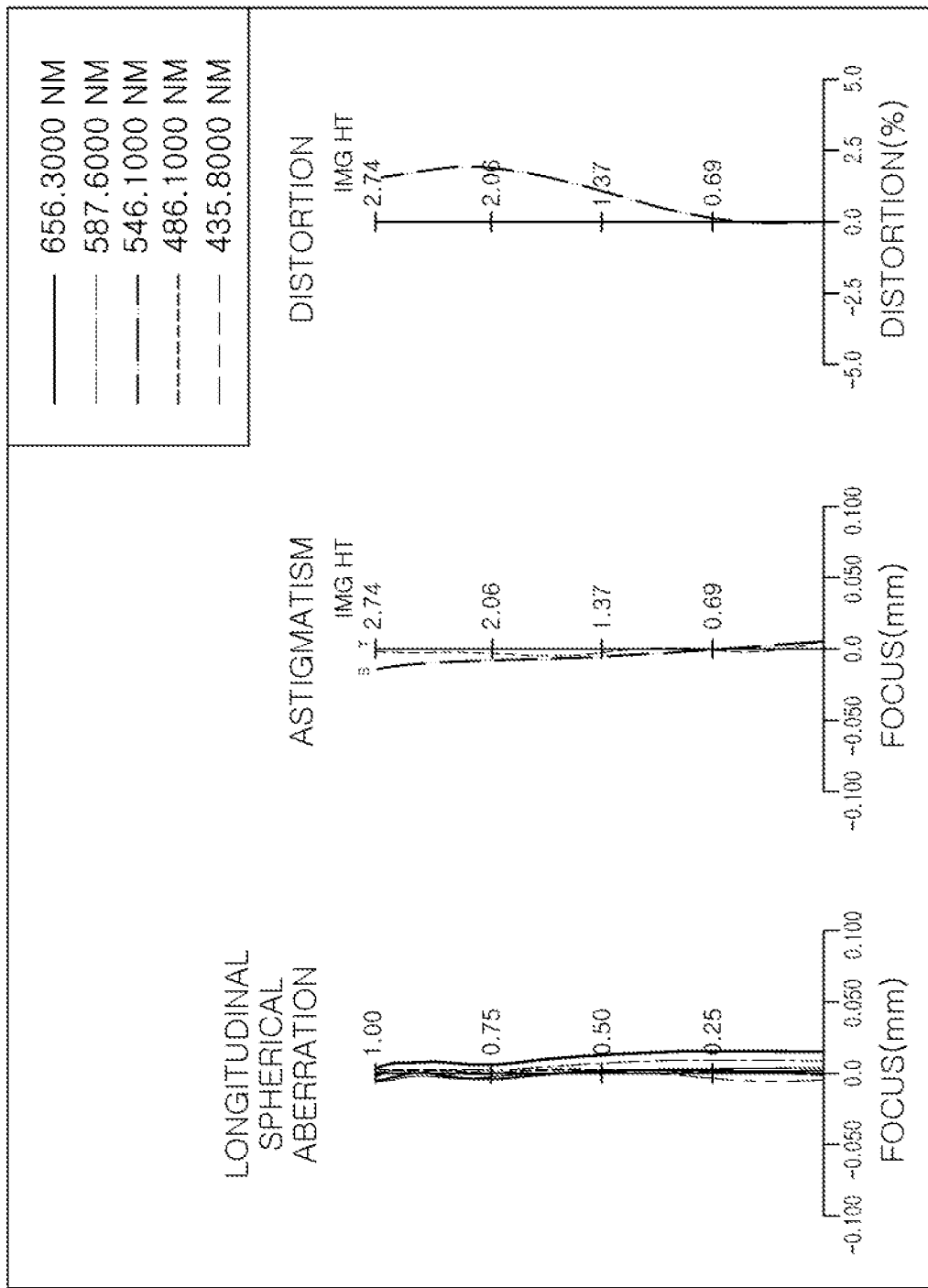

In addition, the optical system configured as described above may have aberration characteristics illustrated in FIGS. 8 and 9.

Figure 10:
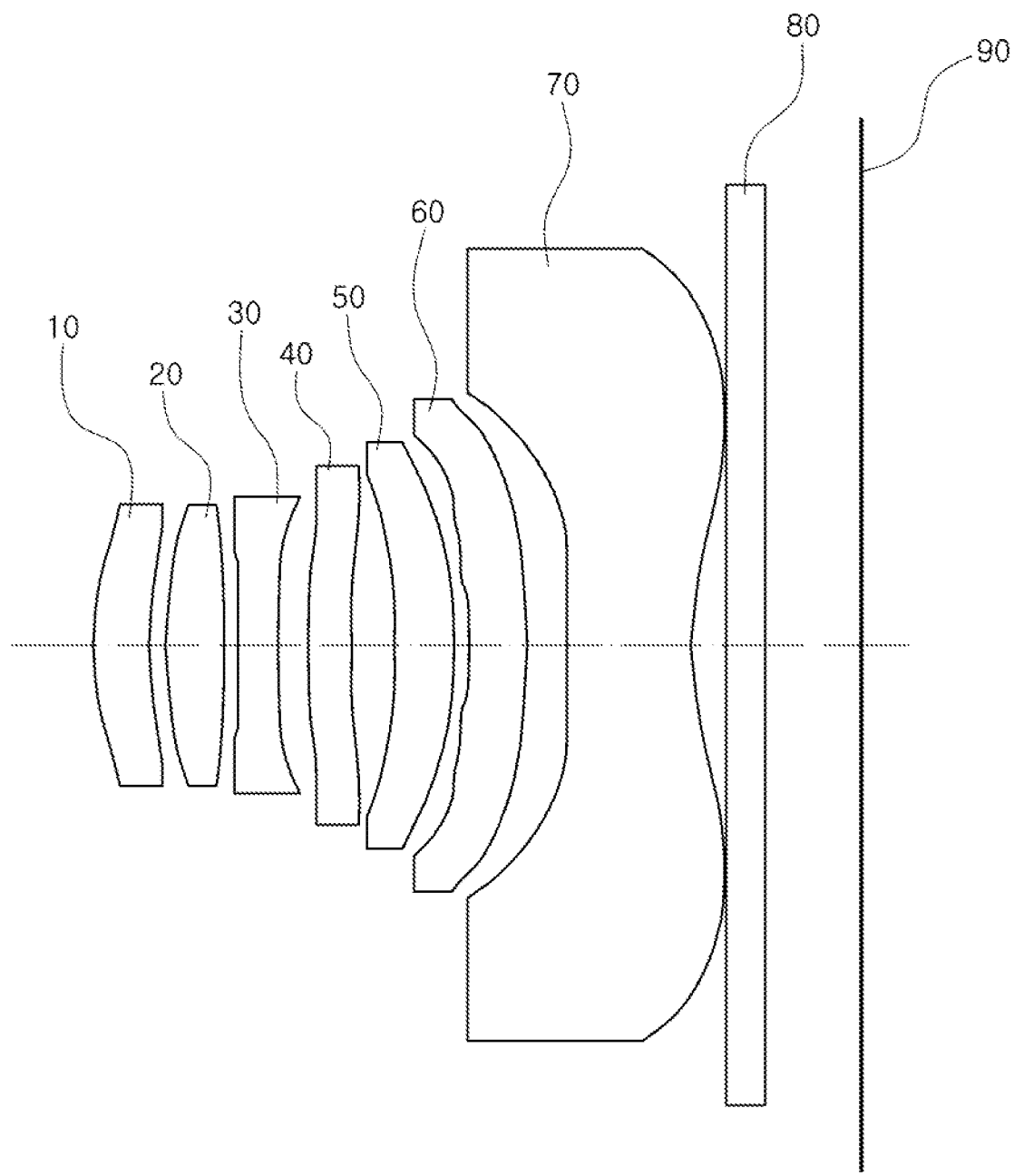
FIG. 10 is a view of an optical system according to a fourth exemplary embodiment of the present disclosure.

An optical system according to a fourth exemplary embodiment of the present disclosure will be described with reference to FIGS. 10 through 12.

The optical system according to the fourth exemplary embodiment may include a first lens 10, a second lens 20, a third lens 30, a fourth lens 40, a fifth lens 50, a sixth lens 60, and a seventh lens 70, and may further include an infrared cut-off filter 80 and an image sensor 90.

Here, respective characteristics (radii of curvature, thicknesses of lenses or distances between the lenses, refractive indices, and Abbe numbers) of lenses are illustrated in Table 7

TABLE 7

| Surface | Radius | Thickness | Index | Abbe Number |
|---|---|---|---|---|
| Object | Infinity | Infinity | | |
| 1 | 1.957 | 0.369 | 1.544 | 56.1 |
| 2 | 3.273 | 0.100 | | |
| 3 | 2.922 | 0.395 | 1.544 | 56.1 |
| 4 | −9.890 | 0.100 | | |
| 5 | −11.571 | 0.240 | 1.639 | 23.2 |
| 6 | 4.736 | 0.204 | | |
| 7 | 3.225 | 0.301 | 1.544 | 56.1 |
| 8 | 4.458 | 0.292 | | |
| 9 | −6.636 | 0.388 | 1.544 | 56.1 |
| 10 | −2.827 | 0.091 | | |
| 11 | −2.549 | 0.402 | 1.639 | 23.2 |
| 12 | −2.415 | 0.255 | | |

TABLE 7-continued

| Surface | Radius | Thickness | Index | Abbe Number |
|---|---|---|---|---|
| 13 | 7.668 | 0.824 | 1.534 | 55.7 |
| 14 | 1.542 | 0.238 | | |
| 15 | Infinity | 0.300 | 1.517 | 64.2 |
| 16 | Infinity | 0.609 | | |
| Image | Infinity | 0.001 | | |

In the fourth exemplary embodiment, the first lens 10 may have positive refractive power, and have a meniscus shape of which an object-side surface is convex. The second lens 20 may have positive refractive power and have both surfaces that are convex. The third lens 30 may have negative refractive power and have both surfaces that are concave. The fourth lens 40 may have positive refractive power and have a meniscus shape of which an object-side surface is convex. The fifth lens 50 may have positive refractive power and have a meniscus shape of which an image-side surface is convex. The sixth lens 60 may have positive refractive power and have a meniscus shape of which an image-side surface is convex. The seventh lens 70 may have negative refractive power and have a meniscus shape of which an object-side surface is convex. In addition, the seventh lens 70 may have an inflection point formed on at least one of first and second surfaces thereof.

Meanwhile, respective surfaces of the first to seventh lenses 10 to 70 may have aspherical surface coefficients as illustrated in Table 8. That is, all of the first surface of the first lens 10 to the second surface of the seventh lens 70 may be aspherical.

TABLE 8

| Example 4 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Y Radius | 1.957 | 3.273 | 2.922 | −9.890 | −11.571 | 4.736 | 3.225 | 4.458 | −6.636 | −2.827 | −2.549 | −2.415 | 7.668 | 1.542 |
| Conic (X) | −1.329 | 0.000 | 0.000 | −13.978 | −38.652 | 16.037 | 0.000 | −1.035 | 5.877 | 0.000 | 0.000 | 0.000 | −6.710 | −6.720 |
| 4th Order (A) | −0.028 | −0.093 | −0.035 | −0.017 | 0.024 | −0.017 | −0.147 | −0.118 | −0.110 | 0.000 | 0.242 | 0.000 | −0.143 | −0.058 |
| 8th Order (B) | −0.029 | −0.042 | −0.013 | −0.097 | −0.097 | 0.038 | 0.099 | 0.055 | 0.078 | 0.000 | −0.231 | 0.000 | 0.017 | 0.014 |
| 8th Order (C) | −0.005 | 0.151 | 0.196 | 0.231 | 0.206 | −0.020 | −0.088 | −0.041 | −0.041 | 0.000 | 0.115 | 0.000 | 0.001 | −0.003 |
| 10th Order (D) | −0.024 | −0.171 | −0.150 | −0.180 | −0.178 | 0.004 | 0.054 | 0.046 | 0.015 | 0.000 | −0.038 | 0.000 | −0.001 | 0.000 |
| 12th Order (E) | 0.014 | 0.059 | 0.028 | 0.032 | 0.066 | 0.009 | −0.023 | −0.015 | 0.000 | 0.000 | 0.005 | 0.000 | 0.000 | 0.000 |
| 14th Order (F) | 0.000 | 0.000 | 0.000 | 0.000 | 0.000 | 0.000 | 0.000 | 0.000 | 0.000 | 0.000 | 0.000 | 0.000 | 0.000 | 0.000 |

Figure 11:
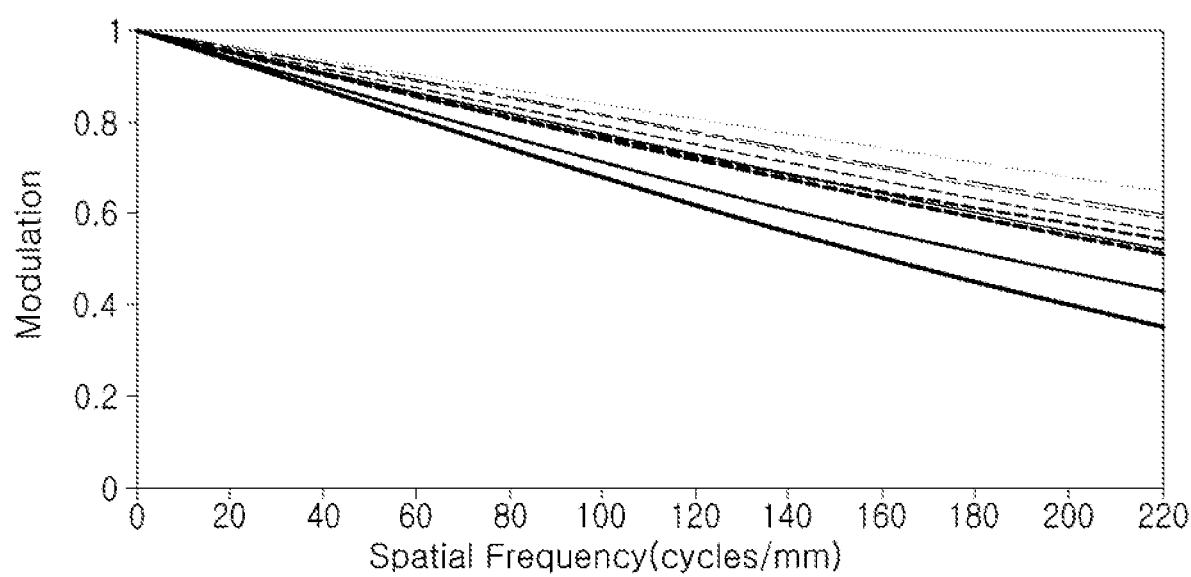
FIGS. 11 and 12 are graphs having curves representing aberration characteristics of the optical system illustrated in FIG. 10.
Figure 12:
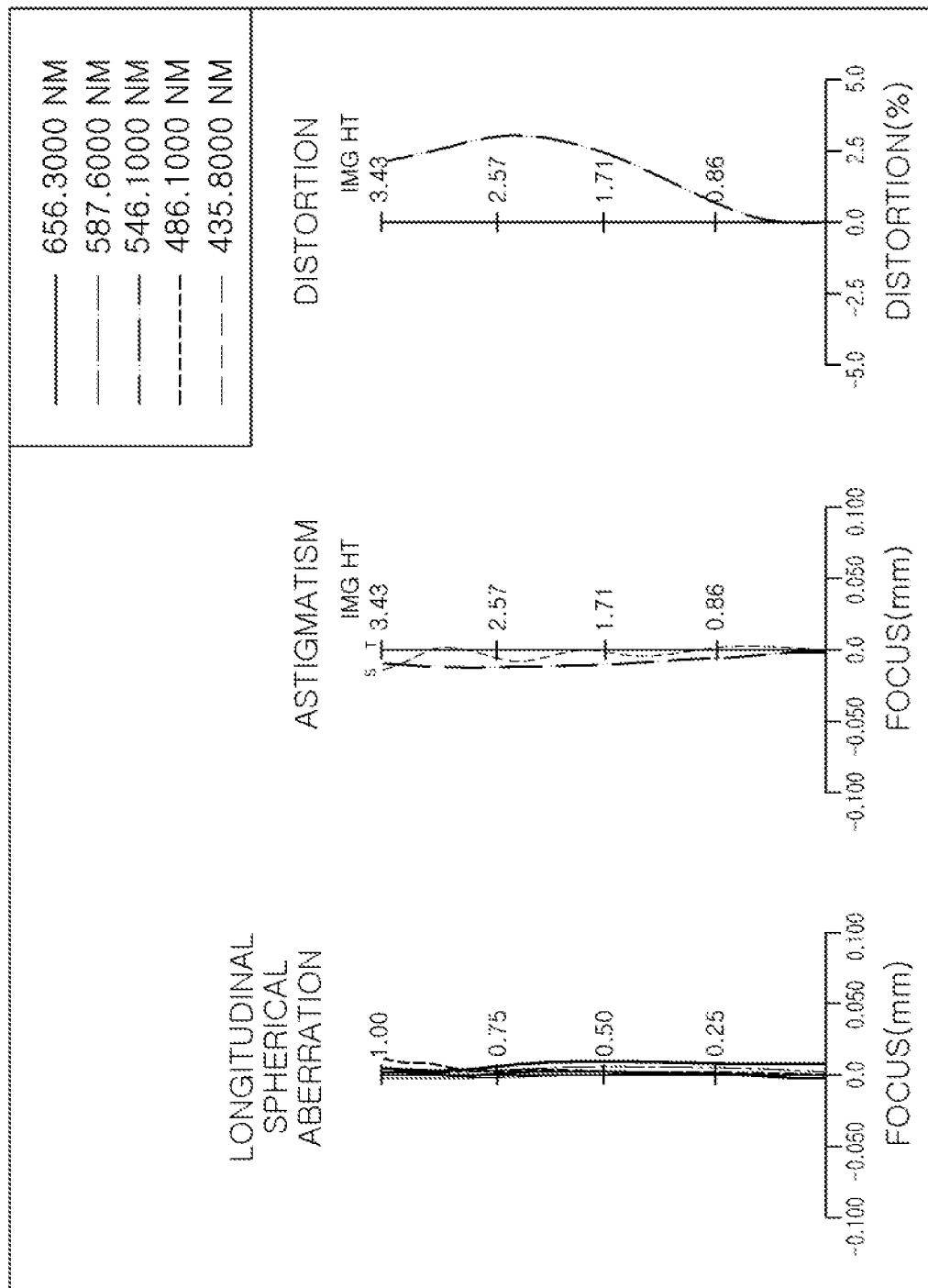

In addition, the optical system configured as described above may have aberration characteristics illustrated in FIGS. 11 and 12.

Figure 13:
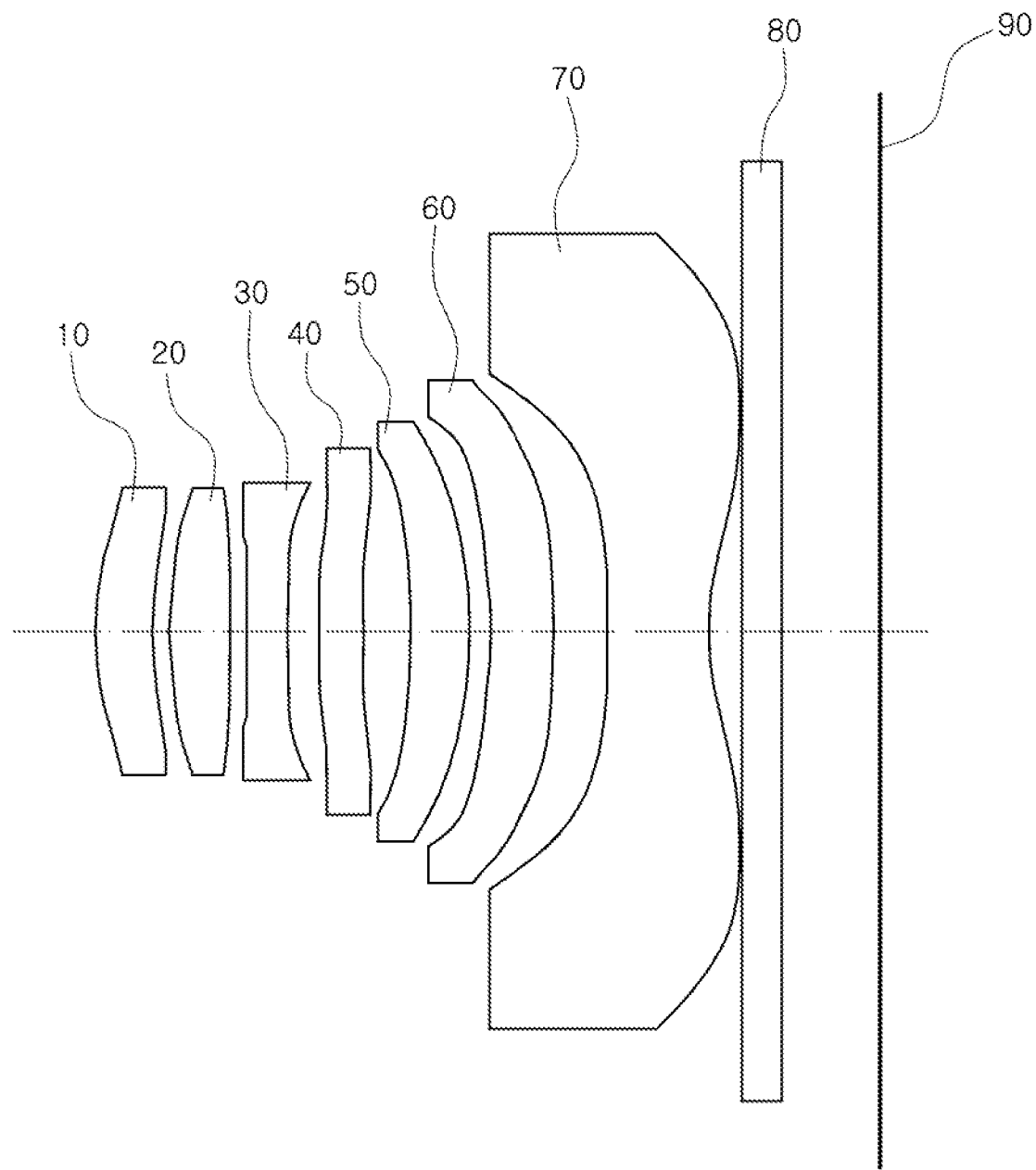
FIG. 13 is a view of an optical system according to a fifth exemplary embodiment of the present disclosure.

An optical system according to a fifth exemplary embodiment of the present disclosure will be described with reference to FIGS. 13 through 15.

The optical system according to the fifth exemplary embodiment may include a first lens 10, a second lens 20, a third lens 30, a fourth lens 40, a fifth lens 50, a sixth lens 60, and a seventh lens 70, and may further include an infrared cut-off filter 80 and an image sensor 90.

Here, respective characteristics (radii of curvature, thicknesses of lenses or distances between the lenses, refractive indices, and Abbe numbers) of lenses are illustrated in Table 9.

TABLE 9

| Surface | Radius | Thickness | Index | Abbe Number |
|---|---|---|---|---|
| Object | Infinity | Infinity | | |
| 1 | 1.931 | 0.367 | 1.544 | 56.1 |
| 2 | 2.993 | 0.103 | | |
| 3 | 2.750 | 0.411 | 1.544 | 56.1 |
| 4 | -11.262 | 0.100 | | |
| 5 | -13.547 | 0.240 | 1.639 | 23.2 |
| 6 | 4.743 | 0.219 | | |
| 7 | 3.212 | 0.285 | 1.544 | 56.1 |
| 8 | 4.233 | 0.330 | | |
| 9 | -6.818 | 0.371 | 1.544 | 56.1 |
| 10 | 2.855 | 0.138 | | |
| 11 | -2.675 | 0.428 | 1.639 | 23.2 |
| 12 | -2.329 | 0.323 | | |

TABLE 9-continued

| Surface | Radius | Thickness | Index | Abbe Number |
|---|---|---|---|---|
| 13 | 14.684 | 0.674 | 1.534 | 55.7 |
| 14 | 1.550 | 0.213 | | |
| 15 | Infinity | 0.300 | 1.517 | 64.2 |
| 16 | Infinity | 0.610 | | |
| Image | Infinity | 0.000 | | |

In the fifth exemplary embodiment, the first lens 10 may have positive refractive power, and have a meniscus shape of which an object-side surface is convex. The second lens 20 may have positive refractive power and have both surfaces that are convex. The third lens 30 may have negative refractive power and have both surfaces that are concave. The fourth lens 40 may have positive refractive power and have a meniscus shape of which an object-side surface is convex. The fifth lens 50 may have positive refractive power and have a meniscus shape of which an image-side surface is convex. The sixth lens 60 may have positive refractive power and have a meniscus shape of which an image-side surface is convex. The seventh lens 70 may have negative refractive power and have a meniscus shape of which an object-side surface is convex. In addition, the seventh lens 70 may have an inflection point formed on at least one of first and second surfaces thereof.

Meanwhile, respective surfaces of the first to seventh lenses 10 to 70 may have aspherical surface coefficients as illustrated in Table 10. That is, all of the first surface of the first lens 10 to the second surface of the seventh lens 70 may be aspherical.

TABLE 10

| Example 5 | 1 | 2 | 3 | 4 | 5 | 6 | 7 | 8 | 8 | 10 | 11 | 12 | 13 | 14 |
|---|---|---|---|---|---|---|---|---|---|---|---|---|---|---|
| Y Radius | 1.931 | 2.993 | 2.750 | -11.262 | -13.547 | 4.743 | 3.212 | 4.233 | -8.818 | -2.855 | -2.875 | -2.329 | 14.684 | 1.550 |
| Conic (K) | -1.318 | 0.000 | 0.000 | -24.417 | -38.652 | 18.097 | 0.000 | -3.129 | 13.482 | 0.000 | 0.000 | 0.598 | -62.710 | -7.444 |
| 4th Order (A) | -0.027 | -0.094 | -0.034 | -0.017 | 0.023 | -0.012 | -0.157 | -0.141 | -0.122 | 0.000 | 0.236 | 0.220 | -0.132 | -0.059 |
| 6th Order (B) | -0.033 | -0.052 | -0.020 | -0.106 | -0.115 | 0.035 | 0.128 | 0.099 | 0.101 | 0.000 | -0.255 | -0.197 | 0.008 | 0.015 |
| 8th Order (C) | 0.005 | 0.166 | 0.202 | 0.254 | 0.211 | -0.030 | -0.100 | -0.082 | -0.088 | 0.000 | 0.139 | 0.095 | 0.003 | -0.003 |
| 10th Order (D) | -0.034 | -0.186 | -0.153 | -0.179 | -0.175 | 0.012 | 0.068 | 0.085 | 0.029 | 0.000 | -0.049 | -0.028 | -0.001 | 0.000 |
| 12th Order (E) | 0.018 | 0.064 | 0.030 | 0.038 | 0.065 | 0.010 | -0.024 | -0.019 | -0.003 | 0.000 | 0.007 | 0.003 | 0.000 | 0.000 |
| 14th Order (F) | 0.000 | 0.000 | 0.000 | 0.000 | 0.000 | 0.000 | 0.000 | 0.000 | 0.000 | 0.000 | 0.000 | 0.000 | 0.000 | 0.000 |

Figure 14:
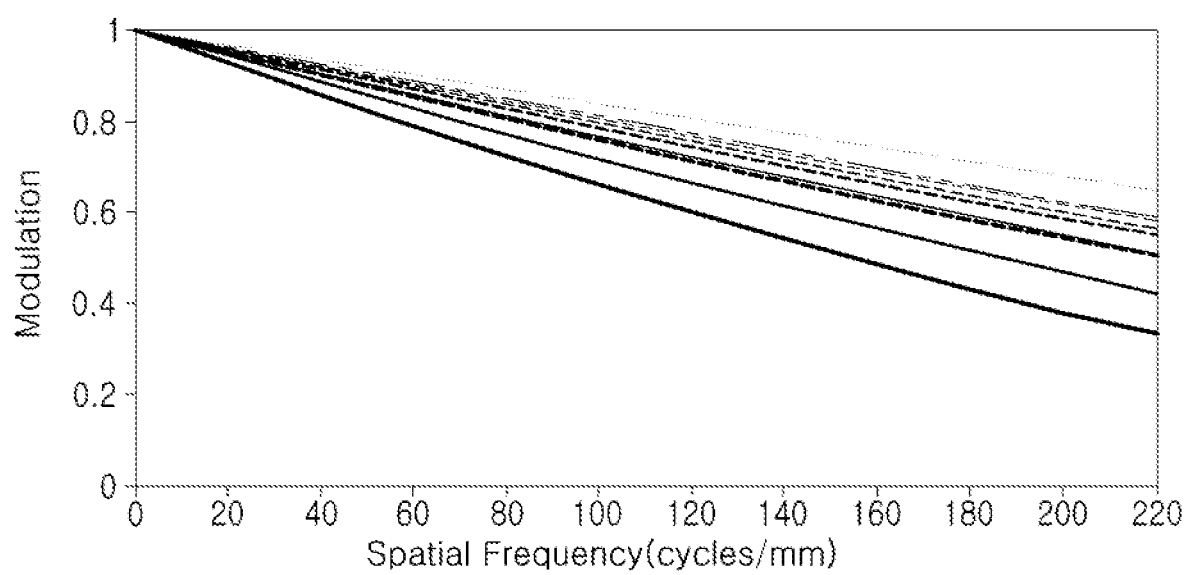
FIGS. 14 and 15 are graphs having curves representing aberration characteristics of the optical system illustrated in FIG. 13.
Figure 15:
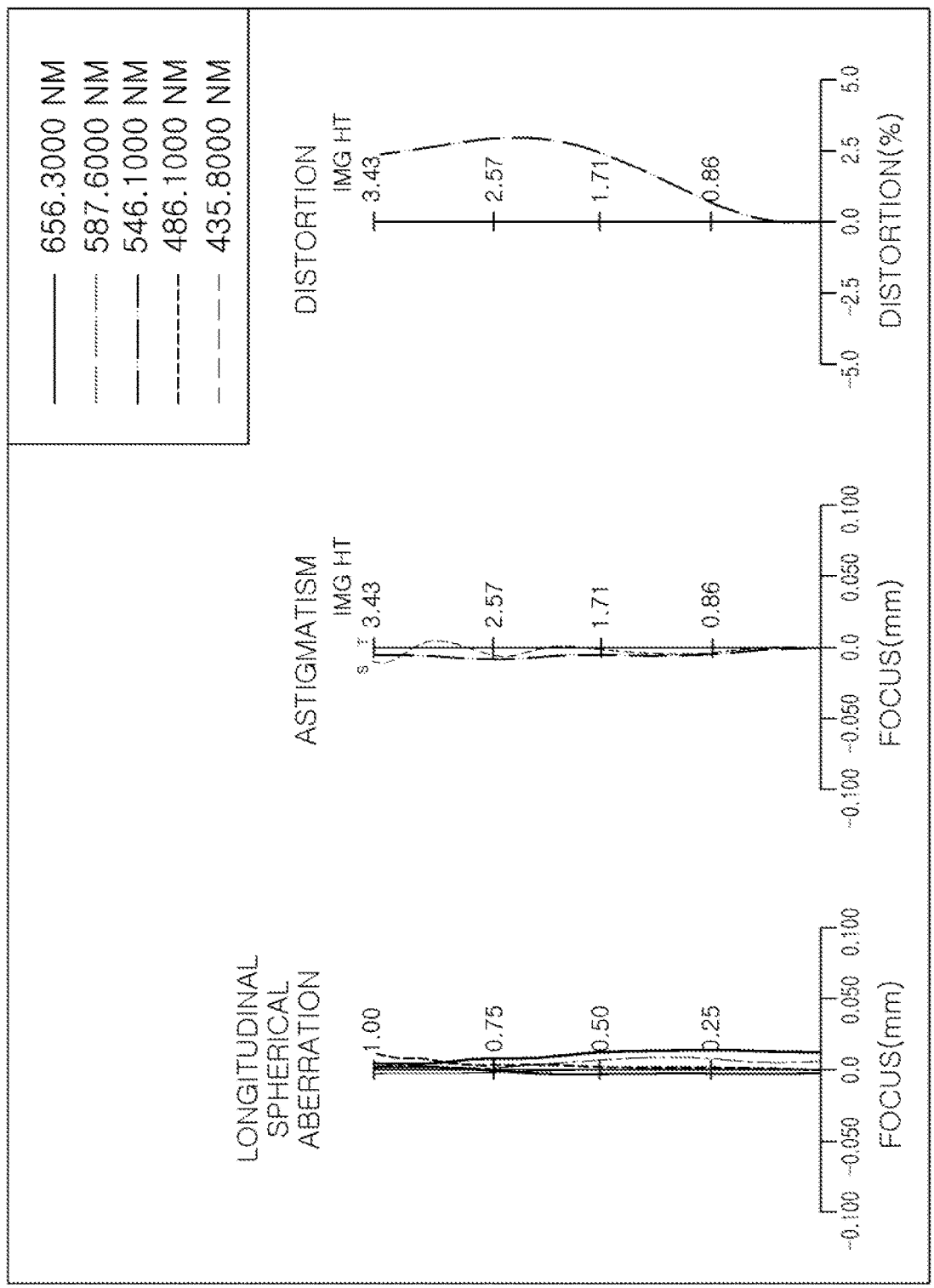

In addition, the optical system configured as described above may have 1.5 aberration characteristics illustrated in FIGS. 14 and 15.

Meanwhile, it may be appreciated from Table 11 that the optical systems according to the first to fifth exemplary embodiments of the present disclosure satisfy Conditional Expressions 1 to 8 described above. Therefore, optical performance of the lens may be improved.

TABLE 11

| Conditional Expression | First Exemplary Embodiment | Second Exemplary Embodiment | Third Exemplary Embodiment | Fourth Exemplary Embodiment | Fifth Exemplary Embodiment |
|---|---|---|---|---|---|
| IMH/EPD | 1.775 | 1.764 | 1.803 | 1.832 | 1.757 |
| IMH | 3.428 | 3.428 | 3.428 | 3.428 | 3.428 |
| EPD | 1.9312 | 1.9425 | 1.9014 | 1.8711 | 1.9507 |
| BFL/TTL | 0.201 | 0.205 | 0.207 | 0.233 | 0.218 |
| BFL | 1.0537 | 1.076 | 1.066 | 1.138 | 1.113 |
| TTL | 5.25 | 5.25 | 5.15 | 5.1 | 5.1 |
| TTL/F | 1.155 | 1.148 | 1.172 | 1.187 | 1.159 |
| F | 4.5474 | 4.574 | 4.3862 | 4.2940 | 4.4 |
| |Nd4 − Nd6| | 0 | 0 | 0.099 | 0.099 | 0.099 |
| Nd4 | 1.6461 | 1.6461 | 1.5465 | 1.5465 | 1.5465 |
| Nd6 | 1.6461 | 1.6461 | 1.6461 | 1.6461 | 1.6461 |

TABLE 11-continued

| Conditional Expression | First Exemplary Embodiment | Second Exemplary Embodiment | Third Exemplary Embodiment | Fourth Exemplary Embodiment | Fifth Exemplary Embodiment |
|---|---|---|---|---|---|
| (R3 − R4)/(R3 + R4) | −1.988 | −2.071 | −3.048 | −1.850 | −1.646 |
| R3 | 2.4783 | 2.9211 | 2.9464 | 2.9219 | 2.7497 |
| R4 | −7.4940 | −8.3754 | −5.8236 | −9.89 | −11.2618 |
| |(R8 − R7)/(R8 + R7)| | 0.031 | 0.015 | 1.372 | 0.160 | 0.137 |
| R7 | 4.2922 | 4.6108 | 13.1162 | 3.2248 | 3.2116 |
| R8 | 4.0339 | 4.4722 | −83.6084 | 4.4578 | 4.2334 |
| R14/F | 0.459 | 0.449 | 0.464 | 0.359 | 0.352 |
| R14 | 2.0876 | 2.0620 | 2.0388 | 1.5416 | 1.5497 |
| F12/F | 0.616 | 0.622 | 0.598 | 0.680 | 0.675 |
| F12 | 2.8044 | 2.8398 | 2.6267 | 2.92 | 2.9705 |

As set forth above, in an optical system according to exemplary embodiments of the present disclosure, an aberration improvement effect may be increased, and a high degree of resolution may be realized.

While exemplary embodiments have been shown and described above, it will be apparent to those skilled in the art that modifications and variations could be made without departing from the scope of the present invention as defined by the appended claims.

What is claimed is:

1. An optical system comprising:
a first lens having positive refractive power and comprising a convex object-side surface and a concave image-side surface;
a second lens having refractive power;
a third lens having refractive power and comprising a concave image-side surface;
a fourth lens having positive refractive power;
a fifth lens having negative refractive power;
a sixth lens having positive refractive power; and
a seventh lens having negative refractive power,
wherein the first to seventh lenses are sequentially disposed from an object side, and
wherein |(r7−r8)/(r7+r8)|<1.4 is satisfied, where r7 is a radius of curvature of an object-side surface of the fourth lens, and r8 is a radius of curvature of an image-side surface of the fourth lens.

2. The optical system of claim 1, wherein the second lens has a convex object-side surface.

3. The optical system of claim 1, wherein the third lens has negative refractive power.

4. The optical system of claim 1, wherein the fourth lens has a convex object-side surface.

5. The optical system of claim 4, wherein the fourth lens has a convex image-side surface.

6. The optical system of claim 1, wherein the sixth lens has a convex image-side surface.

7. The optical system of claim 1, wherein the seventh lens has a concave object-side surface.

8. The optical system of claim 7, wherein the seventh lens has a concave image-side surface.

9. The optical system of claim 1, further comprising an image sensor converting an image of a subject incident thereon through the first to seventh lenses into an electrical signal,
wherein IMH/EPD<2.0 is satisfied, where IMH is a diagonal length of the image sensor, and EPD is an entrance pupil diameter of the optical system.

10. The optical system of claim 1, wherein BFL/TTL<0.25 is satisfied, where BFL is a distance from an image-side surface of the seventh lens to an imaging surface, and TTL is a distance from an object-side surface of the first lens to the imaging surface.

11. The optical system of claim 1, wherein TTL/F<1.2 is satisfied, where TTL is a distance from an object-side surface of the first lens to an imaging surface, and F is an overall focal length of the optical system.

12. The optical system of claim 1, wherein |Nd4−Nd6|<0.1 is satisfied, where Nd4 is a refractive index of the fourth lens, and Nd6 is a refractive index of the sixth lens.

13. The optical system of claim 1, wherein r14/F>0.3 is satisfied, where r14 is a radius of curvature of an image-side surface of the seventh lens, and F is an overall focal length of the optical system.

14. The optical system of claim 1, wherein F12/F>0.5 is satisfied, where F12 is a composite focal length of the first and second lenses, and F is an overall focal length of the optical system.

* * * * *